(12) United States Patent
Suzuki

(10) Patent No.: US 10,984,825 B2
(45) Date of Patent: Apr. 20, 2021

(54) HEAD SUSPENSION ASSEMBLY AND DISK APPARATUS

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yasuo Suzuki, Fujisawa Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/999,430

(22) Filed: Aug. 21, 2020

(65) Prior Publication Data

US 2020/0381013 A1 Dec. 3, 2020

Related U.S. Application Data

(62) Division of application No. 16/537,407, filed on Aug. 9, 2019, now abandoned.

(30) Foreign Application Priority Data

Feb. 15, 2019 (JP) .............................. JP2019-025819

(51) Int. Cl.
*G11B 5/48* (2006.01)
(52) U.S. Cl.
CPC .................................. *G11B 5/484* (2013.01)
(58) Field of Classification Search
None
See application file for complete search history.

(56) References Cited

U.S. PATENT DOCUMENTS

| | | | |
|---|---|---|---|
| 8,780,501 B2 | 7/2014 | Kuwajima | |
| 8,885,294 B2 | 11/2014 | Kudo | |
| 9,251,817 B1 | 2/2016 | Hahn et al. | |
| 9,741,376 B1 | 8/2017 | Ee et al. | |
| 2014/0368954 A1 | 12/2014 | Inoue et al. | |
| 2019/0066720 A1 | 2/2019 | Yamada et al. | |
| 2019/0228796 A1 | 7/2019 | Ee et al. | |
| 2020/0327904 A1* | 10/2020 | Glaess | G11B 5/4806 |

FOREIGN PATENT DOCUMENTS

| | | | |
|---|---|---|---|
| JP | 2014-41666 A | 3/2014 | |
| JP | 5766860 B2 | 8/2015 | |
| JP | 2016219094 A | * 12/2016 | |

\* cited by examiner

*Primary Examiner* — William J Klimowicz
(74) *Attorney, Agent, or Firm* — Kim & Stewart LLP

(57) ABSTRACT

A head suspension assembly includes a support plate, an interconnection member including a metal plate on the support plate, a first insulating layer on the metal plate, a conductive layer on the first insulating layer and forming a pair of connection pads, and a second insulating layer on the conductive layer, a head mounted in the interconnection member, and a piezoelectric element electrically connected to the connection pads and configured to displace the head when a predetermined voltage is applied across the connection pads. At least one opening is formed in each of the connection pads. The piezoelectric element is electrically connected to each of the connection pads by a conductive adhesive that is between the piezoelectric element and each of the connection pads and filled in the opening.

14 Claims, 9 Drawing Sheets

HEAD SUSPENSION ASSEMBLY AND DISK APPARATUS

This application is a division of U.S. patent application Ser. No. 16/537,407, filed Aug. 9, 2019, which is based upon and claims the benefit of priority from Japanese Patent Application No. 2019-025819, filed Feb. 15, 2019, the entire contents of which are incorporated herein by reference.

FIELD

Embodiments described herein relate generally to a head suspension assembly and a disk apparatus equipped with the same.

BACKGROUND

A disk apparatus, such as a hard disk drive (HDD), includes a plurality of magnetic disks rotatable within a casing, a plurality of magnetic heads each reading and writing information from and to one of the magnetic disks, and a head actuator supporting each magnetic head so that the magnetic head is movable with respect to the corresponding magnetic disk.

The head actuator has a plurality of head suspension assemblies each having a tip end portion that supports one magnetic head. Each head suspension assembly has a base plate having one end fixed to an arm, a load beam extending from the base plate, and a flexure or an interconnection member provided on the load beam and the base plate. The flexure has a displaceable gimbal portion and this gimbal portion supports the magnetic head.

In recent years, a head suspension assembly having a microactuator formed of a piezoelectric element has been proposed. The piezoelectric element is mounted in the flexure. Electrodes of the piezoelectric element are electrically and mechanically connected to a conductor pattern, for example, conductive pads on the flexure by, for example, a conductive adhesive.

DETAILED DESCRIPTION

In the HDD, a thermal stress generated when the HDD receives a heat from outside may cause a conduction failure between the conductive pads and the conductive adhesive of the flexure. In case of conduction failure, a function to electrically control the piezoelectric element is impaired. Thus, it is desirable to ensure a sufficient connection strength between each of the conductive pads and the piezoelectric element.

Embodiments provide a head suspension assembly and a disk apparatus that ensure a high connection strength between a conductive pad and a piezoelectric element and that improves reliability.

In general, according to one embodiment, a head suspension assembly includes a support plate, an interconnection member including a metal plate on the support plate, a first insulating layer on the metal plate, a conductive layer on the first insulating layer and forming a pair of connection pads, and a second insulating layer on the conductive layer, a head mounted in the interconnection member, and a piezoelectric element electrically connected to the connection pads and configured to displace the head when a predetermined voltage is applied across the connection pads. At least one opening is formed in each of the connection pads. The piezoelectric element is electrically connected to each of the connection pads by a conductive adhesive that is between the piezoelectric element and each of the connection pads and filled in the opening.

A disk apparatus according to an embodiment will be described hereinafter with reference to the drawings.

It is noted that the disclosure is presented by way of example only and matters which may be changed as appropriate without departing from the spirit of the disclosure and which could easily be conceived of by a person skilled in the art naturally fall within the scope of the present disclosure. Moreover, the drawings are often depicted schematically in magnitudes, shapes, and the like of parts, compared with actual forms for making clearer descriptions. However, the drawings are presented by way of example only and do not limit the reading of the present disclosure. Furthermore, in the present specification and the drawings, similar elements to those already described with reference to the drawings already used are denoted by the same reference signs and detailed descriptions thereof are often omitted as appropriate.

Embodiment

A hard disk drive (HDD) serving as a disk apparatus according to an embodiment will be described in detail.

Figure 1:
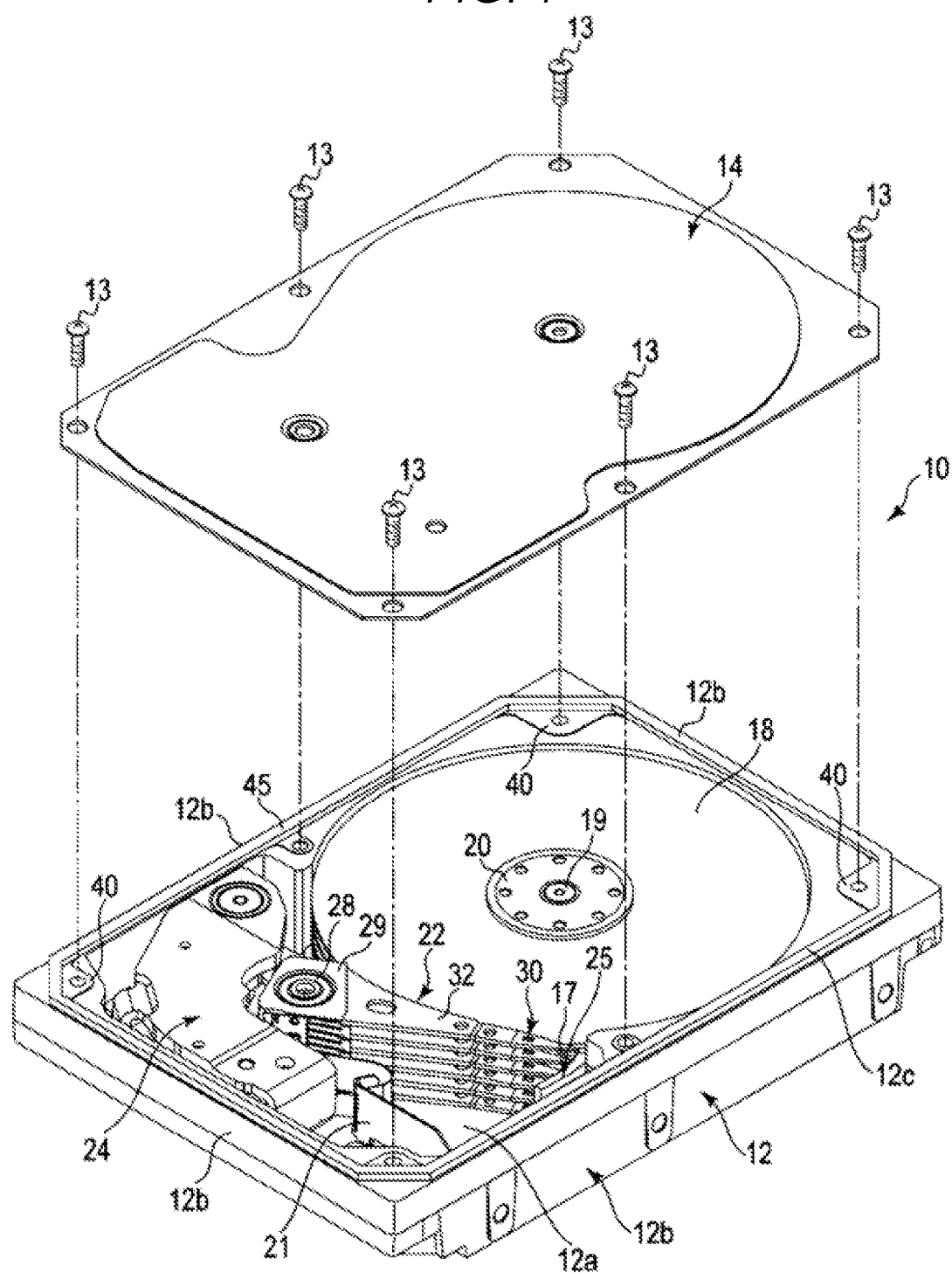
FIG. 1 is an exploded perspective view of a hard disk drive (HDD) according to an embodiment.

FIG. 1 is an exploded perspective view of the HDD according to the embodiment with a cover detached. As depicted in FIG. 1, the HDD includes a rectangular casing 10. The casing 10 has a rectangular box-type base 12 having an opening upper surface and a top cover 14. The base 12 has a rectangular bottom wall 12a and a side wall 12b raised along the periphery of the bottom wall 12a, and the bottom wall 12a and the side wall 12b are formed integrally from, for example, aluminum. The cover 14 is formed from, for example, stainless steel and formed into a rectangular plate shape. The cover 14 is screwed on the side wall 12b of the base 12 by a plurality of screws 13 and seals the upper opening of the base 12.

The casing 10 includes a plurality of five magnetic disks 18, such as disk-like recording mediums, and a spindle motor 19 that supports and rotates the magnetic disks 18. The spindle motor 19 is disposed on the bottom wall 12a. Each magnetic disk 18 is formed into a disk shape having a diameter of, for example, 95 mm (3.5 inches) and has a magnetic recording layer on each of or one of upper and lower surfaces thereof. The magnetic disk 18 is coaxially fitted into a hub, not depicted, of the spindle motor 19, clamped by a clamp spring 20, and fixed to the hub. The magnetic disk 18 is thereby supported in parallel to the bottom wall 12a of the base 12. Each of the plurality of magnetic disks 18 are rotated at a predetermined revolving speed by the spindle motor 19.

While the five magnetic disks 18 are accommodated in the casing 18 in the present embodiment, the number of the magnetic disks 18 is not limited to five and may be increased or decreased. Alternatively, a single magnetic disk 18 may be accommodated in the casing 10.

The casing 10 includes a plurality of magnetic heads 17 each recording and reproducing information in and from one magnetic disk 18 (refer to FIG. 2) and a head actuator 22 supporting these magnetic heads 17 so that each magnetic head 17 is movable with respect to one magnetic disk 18. Furthermore, the casing 10 includes a voice coil motor (VCM) 24 that rotates and positions the head actuator 22, a ramp load mechanism 25 that holds any of the magnetic heads 17 at an unloaded position apart from the corresponding magnetic disk 18 when the magnetic head 17 moves to an outermost circumference of the magnetic disk 18, and a board unit 21 (e.g., a flexible printed circuit (FPC) unit) in which electronic components such as a conversion connector are mounted.

The head actuator 22 has an actuator block 29 incorporating a bearing unit 28, a plurality of arms 32 extending from the actuator block 29, and suspension assemblies 30 (often referred to as "head gimbal assemblies (HGAs)") extending from the respective arms 32. One magnetic head 17 is supported on a tip end portion of each suspension assembly 30. The head actuator 22 is rotatably supported by a pivot raised on the bottom wall 12a via the bearing unit 28.

A printed circuit board, not depicted, is screwed on an outer surface of the bottom wall 12a. A control unit is implemented in the printed circuit board, and this control unit controls the spindle motor 19 to operate and also controls the VCM 24 and the magnetic heads 17 to operate via the board unit 21.

A configuration of the suspension assembly 30 will next be described in detail.

Figure 2:
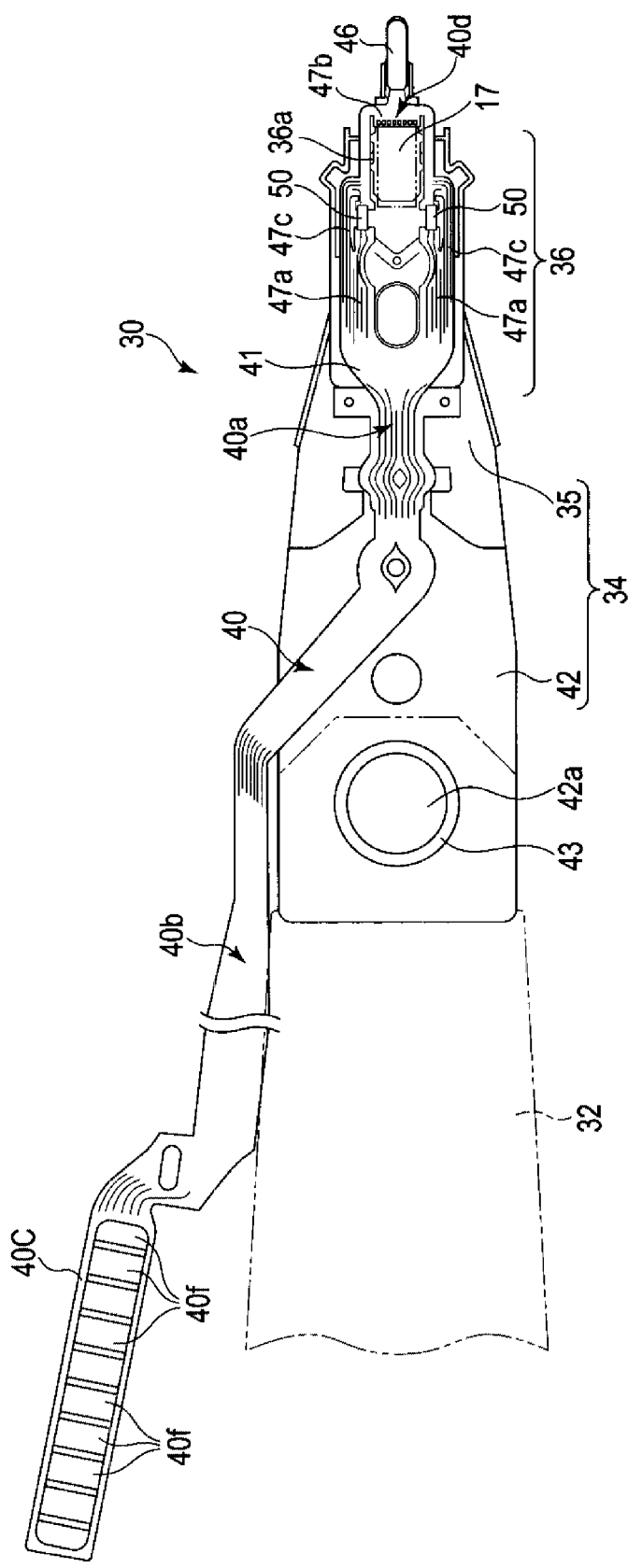
FIG. 2 is a plan view of a head suspension assembly of the HDD.
Figure 3:
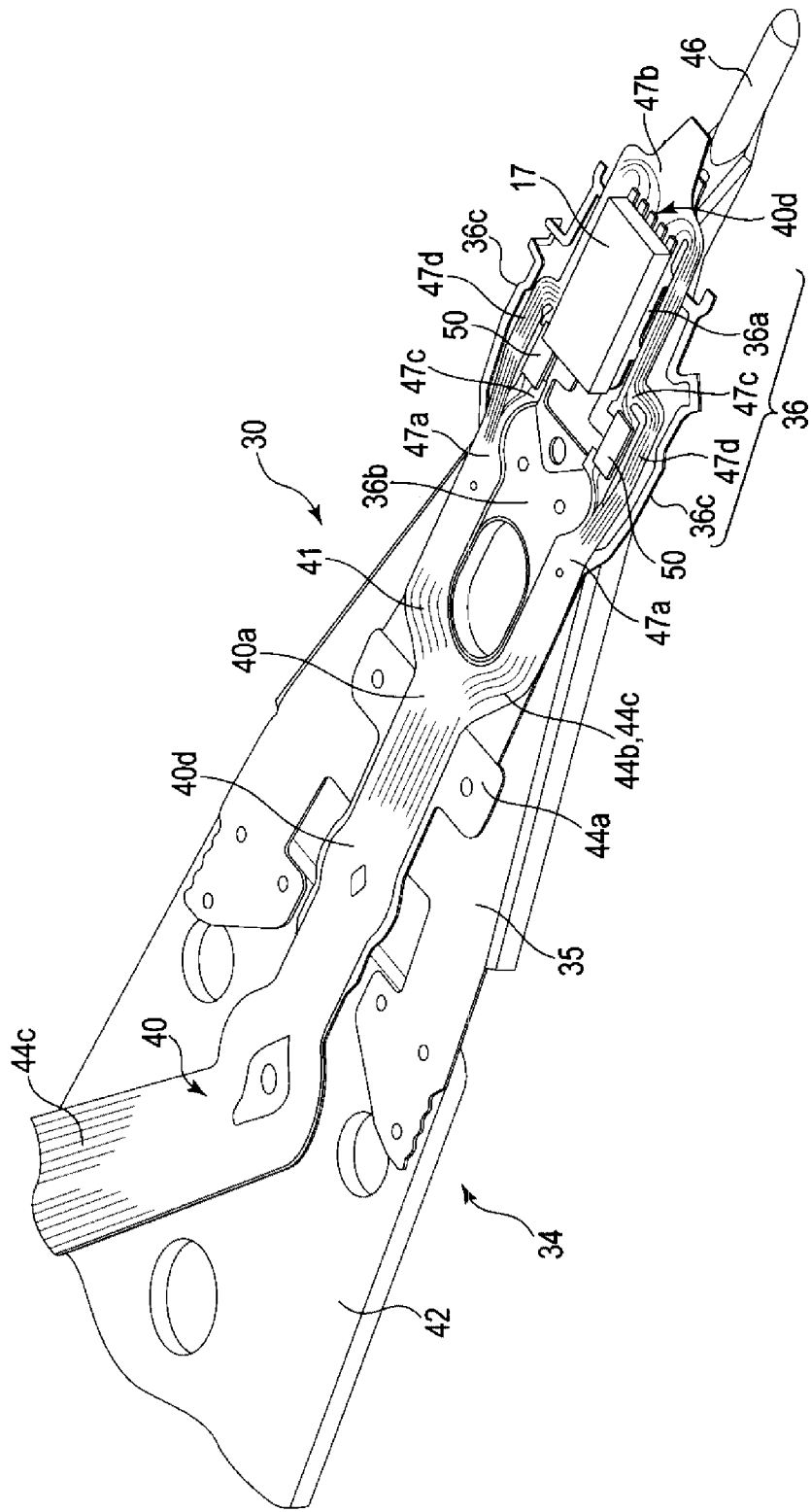
FIG. 3 is a perspective view depicting the head suspension assembly.

FIG. 2 is a plan view of the suspension assembly and FIG. 3 is a perspective view of the suspension assembly.

As depicted in FIGS. 2 and 3, each suspension assembly 30 has a suspension 34 extending from one arm 32, and one magnetic head 17 is attached to a tip end portion of this suspension 34. A combination of one magnetic head 17 and one suspension assembly 30 that supports this magnetic head 17 will be referred to as a "head suspension assembly".

The suspension 34 that functions as a support plate has a rectangular base plate 42 formed from a metal plate at a thickness of several hundred micrometers, and a long and thin plate spring-like load beam 35 formed from a metal plate at a thickness of several tens of micrometers. The load beam 35 is disposed so that a base end portion thereof is superimposed on a tip end portion of the base plate 42 and fixed to the base plate 42 by welding a plurality of locations thereof. The base end portion of the load beam 35 has a width generally identical to that of the base plate 42. A rod-like tab 46 protrudes on a tip end of the load beam 35.

The base plate 42 has a circular opening 42a provided in the base end portion and an annular projection portion 43 located around this opening 42a. The base plate 42 is fastened to a tip end portion of the arm 32 by fitting the projection portion 43 into a circular caulking hole, not depicted, formed in a caulking bearing surface of the arm 32 and caulking this projection portion 43. A base end of the base plate 42 may be fixed to a tip end of the arm 32 by laser welding, spot welding, or adhesive bonding.

The suspension assembly 30 has a long and thin strip-like flexure 40 for transmitting recording and reproducing signals and a driving signal for driving a pair of piezoelectric elements (for example, PZT elements) 50 mounted in the flexure 40, and the piezoelectric elements 50. As depicted in FIG. 2, the flexure 40 has a tip end side portion 40a that is disposed on the load beam 35 and the base plate 42, and has an extension portion 40b that extends outward from a side edge of the base plate 42 and that extends along a side edge of the arm 32. A connection end portion 40C located on a tip end of the extension portion 40b has a plurality of connection pads 40f. These connection pads 40f are connected to a main FPC of the board unit 21.

A tip end portion of the flexure 40 has a gimbal portion 36 that is located on a tip end portion of the load beam 35 and that functions as an elastic support portion. The magnetic head 17 is placed and fixed onto the gimbal portion 36 and is supported by the load beam 35 via this gimbal portion 36. The pair of piezoelectric elements 50 serving as driving elements are mounted in the gimbal portion 36 and are located closer to the base end of the load beam 35 than the magnetic head 17.

Figure 4:
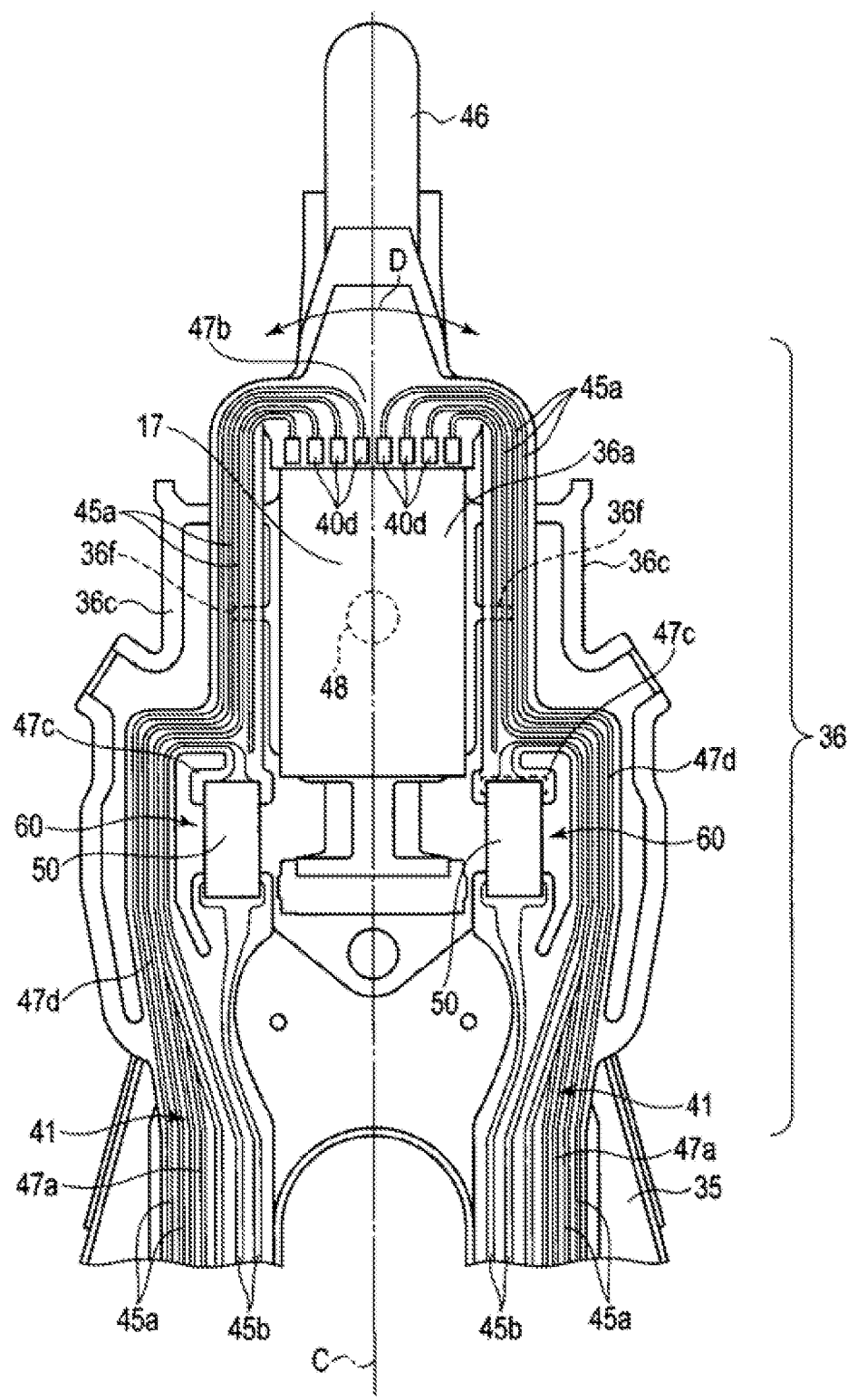
FIG. 4 is a plan view depicting an enlarged tip end portion of the head suspension assembly.

FIG. 4 is a plan view depicting the enlarged tip end portion of the suspension assembly 30.

As depicted in FIGS. 3 and 4, the flexure 40 has a sheet metal 44a serving as a base and formed from stainless steel or the like, and a strip-like stacked member 41 bonded or fixed onto the sheet metal 44a, and has a long and thin stacked plate. The stacked member 41 has a base insulating layer 44b most of which is fixed to the sheet metal 44a, a conductive layer 44c that is formed on the base insulating layer 44b and that makes up a plurality of signal interconnections 45a, a plurality of driving interconnections 45b, and the plurality of connection pads 40f, and a cover insulating layer 44d that covers the conductive layer 44c to be stacked on the base insulating layer 44b (refer to FIG. 7). As the conductive layer 44c, a copper foil, for example, may be used. In the tip end side portion 40a of the flexure 40, the sheet metal 44a is bonded onto surfaces of the load beam 35 and the base plate 42 or welded thereonto at a plurality of welding points by spot welding.

In the gimbal portion 36 of the flexure 40, the sheet metal 44a has a rectangular tongue portion 36a that is located on a tip end side, a generally rectangular base end portion 36b that is opposed to the tongue portion 36a across a space and that is located on a base end side, a pair of long and thin outriggers 36c that extend from the tongue portion 36a to the base end portion 36b, and a pair of handles 36f that protrude from both side edges of the tongue portion 36a to both sides thereof.

The base end portion 36b is bonded onto the surface of the load beam 35 or fixed onto the surface of the load beam 35 by spot welding. The tongue portion 36a has a size and a shape such that the magnetic head 17 is placed on the tongue portion 36a, and has a generally rectangular shape, for example. The tongue portion 36a is disposed so that a central axis in a width direction of the tongue portion 36a matches a central axis C of the suspension 34. Furthermore, a generally central portion of the tongue portion 36a abuts on a dimple 48 protruding in the tip end portion of the load beam 35. The tongue portion 36a is displaceable in various directions by elastic deformations of the pair of outriggers 36c. The tongue portion 36a and the magnetic head 17 can thereby flexibly follow a surface fluctuation of the magnetic disk 18 in rolling and pitch directions and it is possible to maintain a minute gap between a surface of the magnetic disk 18 and the magnetic head 17.

In the gimbal portion 36, part of the stacked member 41 of the flexure 40 forks into two branches, which are located on both sides of the central axis C of the suspension 34. The stacked member 41 has a base end portion 47a fixed to the base end portion 36b of the sheet metal 44a, a tip end portion 47b bonded onto the tongue portion 36a, a pair of strip-like first bridge portions 47c extending from the base end portion 47a to the tip end portion 47b, and a pair of strip-like second bridge portions 47d arranged side by side with the first bridge portions 47c, extending from the base end portion 47a halfway across the first bridge portions 47c, and merging with the first bridge portions 47c. The first bridge portions 47c are located side by side with the outriggers 36c on both sides of the tongue portion 36a and extend along a longitudinal direction of the load beam 35. Furthermore, the first bridge portions 47c extend to pass on the handles 36f and crossbars of the outriggers 36c and are partially fixed to the handles 36f and the crossbars. Part of each first bridge portion 47c has a mounting portion 60 in which each piezoelectric element 50 is mounted.

The magnetic head 17 is fixed to the tongue portion 36a by an adhesive. The magnetic head 17 is disposed so that a longitudinal central axis thereof matches the central axis C of the suspension 34, and a generally central portion of the magnetic head 17 is located on the dimple 48. A recording element and a reproducing element of the magnetic head 17 are electrically joined to a plurality of electrode pads 40d in the tip end portion 47b by a conductive adhesive such as a solder or a silver paste. The magnetic head 17 is thereby connected to the signal interconnections 45a via the electrode pads 40d.

The mounting portion 60 and the piezoelectric element 50 will be described in detail.

Figure 5:
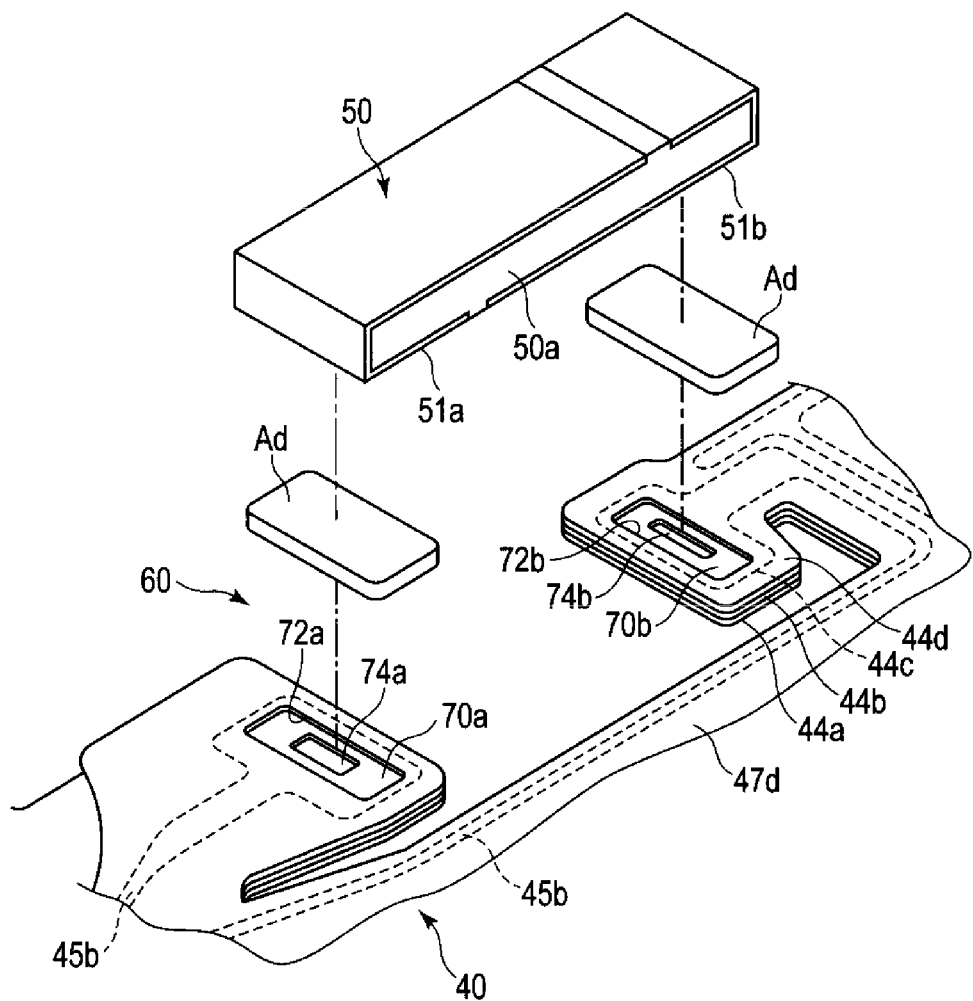
FIG. 5 is an exploded perspective view depicting pad portions and a piezoelectric element of a flexure in the head suspension assembly.
Figure 6:
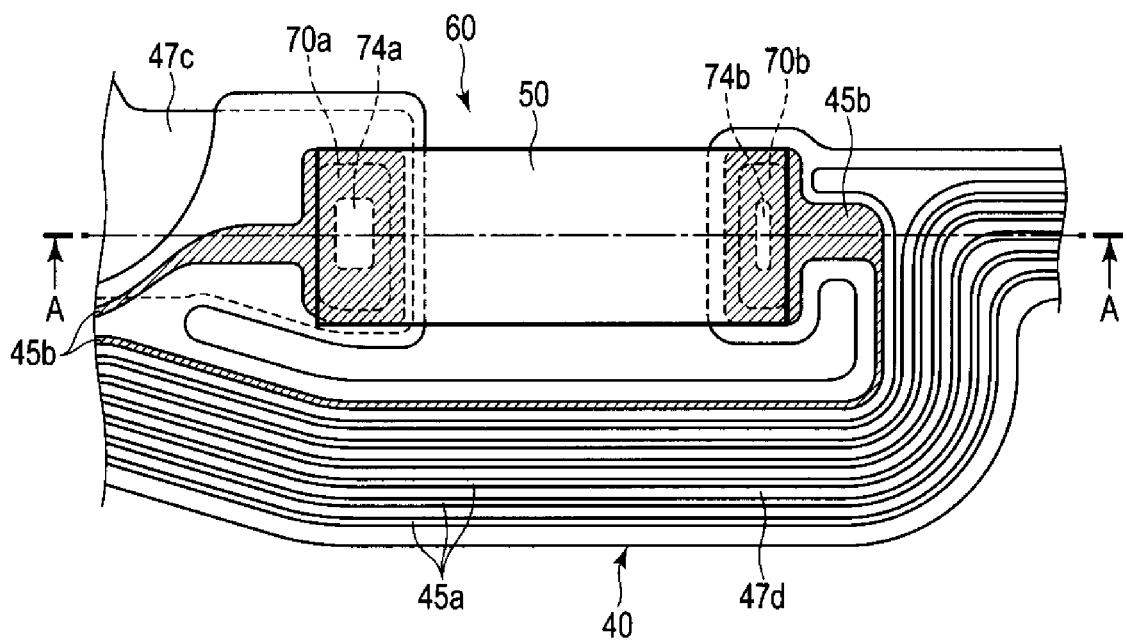
FIG. 6 is a plan view depicting the pad portions and the piezoelectric element of the flexure in the head suspension assembly.
Figure 7:
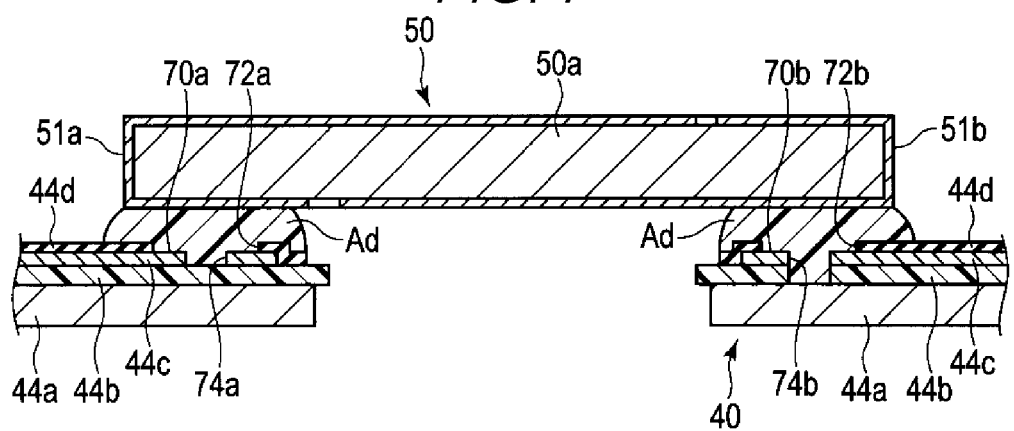
FIG. 7 is a cross-sectional view of the pad portions and the piezoelectric element along line A-A of FIG. 6.

FIG. 5 is an exploded perspective view depicting the mounting portion and the piezoelectric element of the flexure 40, FIG. 6 is a plan view of the mounting portion in which the piezoelectric element is mounted, and FIG. 7 is a cross-sectional view of the mounting portion and the piezoelectric element along line A-A of FIG. 6.

As depicted in FIG. 5, the mounting portion 60 has a first connection pad 70a and a second connection pad 70b each formed from the conductive layer 44c. The first connection pad 70a and the second connection pad 70b are continuous with the driving interconnections 45b each formed from the conductive layer 44c. The first connection pad 70a and the second connection pad 70b are arranged side by side at a predetermined distance therebetween in a direction parallel to the center axis C of the load beam 35. In the present embodiment, the first bridge portions 47c of the flexure 40 are divided between the first connection pad 70a and the second connection pad 70b. The first connection pad 70a and the second connection pad 70b are thereby disposed across a space at a predetermined length.

In the cover insulating layer 44d stacked on the conductive layer 44c, openings 72a and 72b are provided at positions overlapping the first connection pad 70a and the second connection pad 70b, respectively. Most of the first connection pad 70a and most of the second connection pad 70b are exposed to an outer surface of the cover insulating layer 44d through the openings 72a and 72b, respectively. As an example, the first connection pad 70a and the second connection pad 70b are each formed into a rectangular shape, and the openings 72a and 72b are similarly each formed into a rectangular shape slightly smaller in dimensions than those of the first and second connection pads 70a and 70b.

According to the present embodiment, an opening 74a is provided in part, for example, a generally central portion of the first connection pad 70a. In the present embodiment, the opening of the connection pad is a through-hole that penetrates the connection pad in a thickness direction. The opening 74a has, for example, a rectangular shape and penetrates the first connection pad 70a. Part of the base insulating layer 44b is exposed via the opening 74a.

An opening 74b is provided in part, for example, a central portion of the second connection pad 70b. The opening 74b has, for example, a rectangular shape and penetrates the second connection pad 70b. Part of the base insulating layer 44b is exposed via the opening 74b. In the present embodiment, the second connection pad 70b is used as a ground-side connection pad. In this case, the opening 74b may further penetrate the base insulating layer 44b. Part of the sheet metal 44a is thereby exposed into the opening 74b.

As an example, the piezoelectric element 50 serving as the driving element has a piezoelectric main body 50a formed from a piezoelectric material and formed into a flat rectangular parallelepiped shape, and a first electrode 51a and a second electrode 51b provided on an outer surface of the piezoelectric main body 50a. As the piezoelectric material, lead zirconate titanate or ceramic, for example, is used.

The first electrode 51a extends from one end portion of a lower surface of the piezoelectric main body 50a over a side surface of a short side and most of an upper surface of the piezoelectric main body 50a. The second electrode 51b extends from one end portion of the upper surface of the piezoelectric main body 50a over a side surface of the other short side and most of the lower surface of the piezoelectric main body 50a. On the lower surface of the piezoelectric main body 50a, one end of the first electrode 51a is opposed to one end of the second electrode 51b at a gap given therebetween. On the upper surface of the piezoelectric main body 50a, the other end of the first electrode 51a is opposed to the other end of the second electrode 51b at a gap given therebetween.

Applying a voltage between the first electrode 51a and the second electrode 51b causes the piezoelectric main body 50a held between the first electrode 51a and the second electrode 51b to expand or contract in the longitudinal direction. As an example, the first electrode 51a is a voltage application (Vin)-side electrode, while the second electrode 51b is a ground (GND)-side electrode.

As depicted in FIGS. 5 to 7, the piezoelectric element 50 is disposed on the mounting portion 60 in a state in which one end portion of the piezoelectric main body 50a in the longitudinal direction (i.e., the first electrode 51a) is opposed to the first connection pad 70a and in which the other end portion thereof in the longitudinal direction (i.e., the second electrode 51b) is opposed to the second connection pad 70b. A conductive adhesive Ad is filled between the first connection pad 70a and the first electrode 51a. As the conductive adhesive Ad, a solder or a silver paste, for example, may be used. The first electrode 51a is electrically and mechanically connected to the first connection pad 70a by the conductive adhesive Ad. At this time, the conductive adhesive Ad is also filled into the opening 74a of the first connection pad 70a, and adhesively bonded to a surface of the first connection pad 70a, an inner surface of the opening 74a, and the base insulating layer 44b.

Likewise, the conductive adhesive Ad is filled between the second connection pad 70b and the second electrode 51b. The second electrode 51b is electrically and mechanically connected to the second connection pad 70b by the conductive adhesive Ad. The conductive adhesive Ad is also filled into the opening 74b of the second connection pad 70b, and adhesively bonded to a surface of the second connection pad 70b, an inner surface of the opening 74b, and the sheet metal 44a.

A driving voltage is applied to the first electrode 51a via the driving interconnections 45b, the first connection pad 70a, and the conductive adhesive Ad. While the second electrode 51b is connected to the second connection pad 70b via the conductive adhesive Ad and is also electrically connected to the sheet metal 44a of the flexure 40, no problem occurs in a case of using the second electrode 51b as a ground.

In the HDD configured as described above, applying the voltage to each piezoelectric element 50 via the driving interconnections 45b causes the piezoelectric element 50 to expand and contract along the longitudinal direction of the piezoelectric element 50 (i.e., the direction parallel to the central axis C of the suspension 34). As indicated by an arrow D in FIG. 4, driving the two piezoelectric elements 50 in inverted directions of expansion and contraction causes the pair of first bridge portions 47c to similarly stroke in opposite directions. The first bridge portions 47c shake the tongue portion 36a of the gimbal portion 36 and the magnetic head 17 in arrow D directions about the dimple 48 via the handles 36f. In this way, it is possible to minutely displace the magnetic head 17 by expansion and contraction motions of the piezoelectric elements 50. The shaking directions D of the magnetic head 17 correspond to seek directions of the magnetic head 17 (i.e., cross-track directions) on the magnetic disk 18.

According to the present embodiment, the openings 74a and 74b are provided in at least one of the first connection pad 70a and the second connection pad 70b of the flexure 40, and provided herein in both of the first and second connection pads 70a and 70b. The conductive adhesive Ad filled between the electrodes 51a and 51b of each piezoelectric element 50 and the connection pads 70a and 70b is also filled into the openings 74a and 74b of the connection pads 70a and 70b and adhesively bonded to the surfaces of the connection pads 70a and 70b, the inner surfaces of the openings 74a and 74b, and the base insulating layer 44b. This can enlarge a contact area between the adhesive Ad and each of the first and second connection pads 70a and 70b and improve an adhesive strength. Furthermore, filling the adhesive Ad into the openings 74a and 74b produces an anchor effect to further improve the adhesive strength. Moreover, since the opening 74b penetrates the ground-side second connection pad 70b and the base insulating layer 44b in the ground-side second connection pad 70b, the contact area between the inner surface of the opening 74b and the adhesive Ad further increases and a greater anchor effect can be obtained. Therefore, the adhesive strength of the adhesive Ad to each of the first and second connection pads 70a and 70b is further improved.

Enhancing the adhesive strength between each of the first and second connection pads 70a and 70b and the conductive adhesive Ad in this way makes it possible to prevent occurrence of a conduction failure when the HDD receives a thermal stress from outside and to improve electrical connection reliability and operation reliability of the piezoelectric elements 50.

As described so far, according to the present embodiment, it is possible to provide the head suspension assembly and the disk apparatus that ensure a high connection strength of each piezoelectric element 50 and that improve the reliability.

The number of openings 74a or 74b in the first and second connection pads 70a and 70b is not limited to one and a plurality of openings may be provided in each of the first and second connection pads 70a and 70b. Furthermore, the shape of the openings 74a or 74b is not limited to the rectangular shape and may be selected from among various shapes. A plurality of modifications of the head suspension assembly will be described hereinafter. In the following modifications, same parts as those in the embodiment described above are denoted by the same reference signs and detailed descriptions thereof are either omitted or simplified.

First Modification

Figure 8:
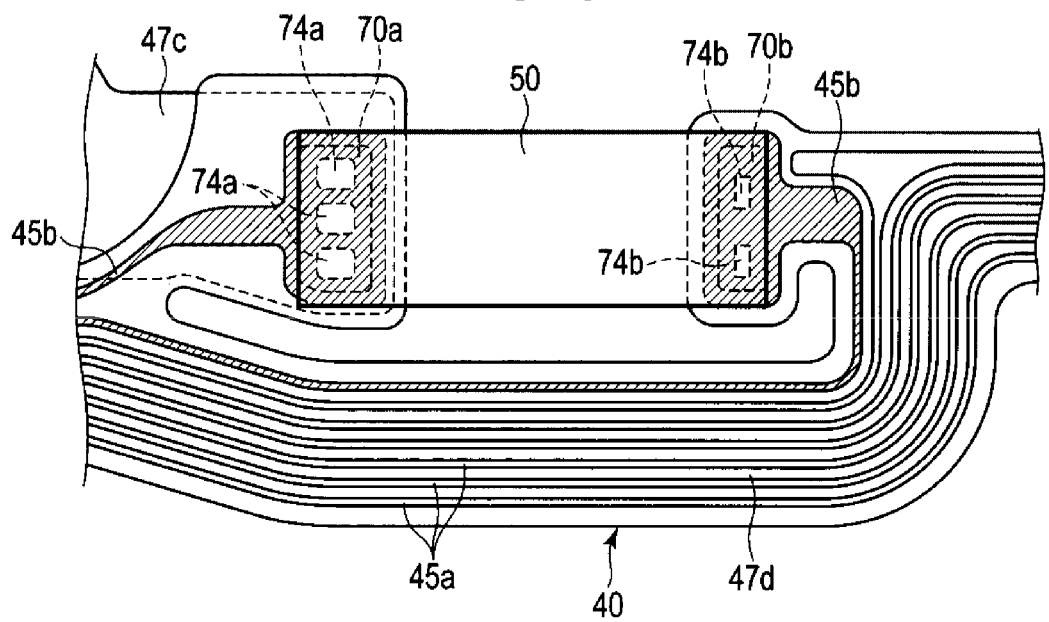
FIG. 8 is a plan view depicting pad portions and a piezoelectric element of an HDD according to a first modification.

FIG. 8 is a plan view depicting connection pad portions and a piezoelectric element of a suspension assembly according to a first modification. As depicted in FIG. 8, according to the first modification, a plurality of, for example, three openings 74a are formed in the first connection pad 70a. The openings 74a are each formed into a rectangular shape. Furthermore, two openings 74b are provided in the second connection pad 70b. In this way, providing the plurality of openings 74a and 74b makes it possible to increase the contact area between the conductive adhesive Ad and each of the first and second connection pads 70a and 70b and to increase the anchor effect. Therefore, the adhesive strength of the conductive adhesive Ad to each of the first and second connection pads 70a and 70b is further improved.

Second Modification

Figure 9:
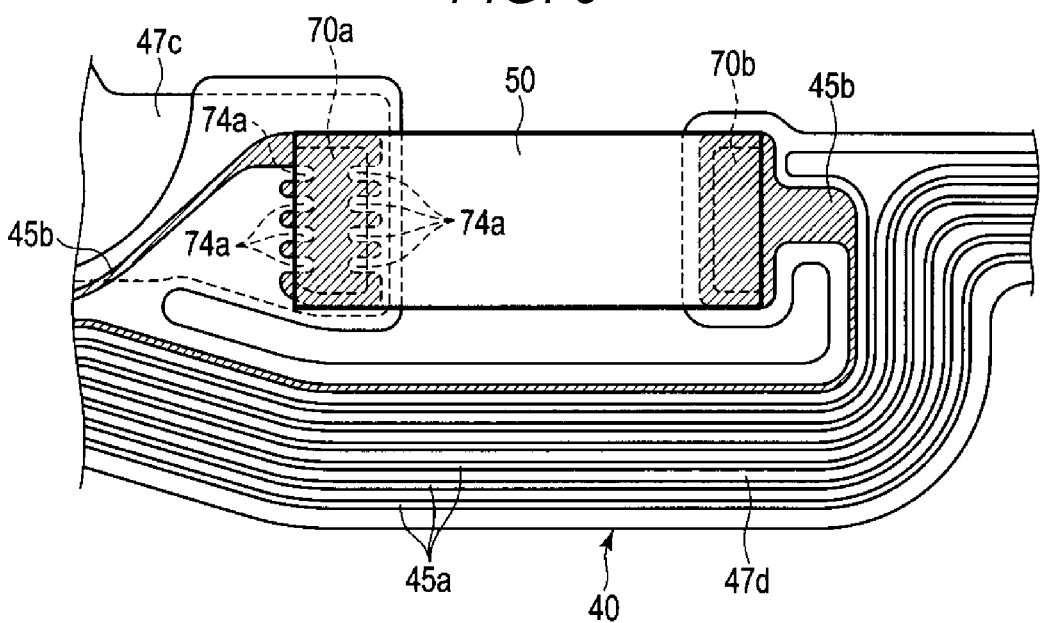
FIG. 9 is a plan view depicting pad portions and a piezoelectric element of an HDD according to a second modification.

FIG. 9 is a plan view depicting connection pad portions and a piezoelectric element of a suspension assembly according to a second modification. As depicted in FIG. 9, according to the second modification, the opening 74a of the first connection pad 70a is formed into a comb-teeth shape. In other words, a plurality of openings 74a are formed unevenly on a pair of opposed side edges of the first connection pad 70a.

Third Modification

Figure 10:
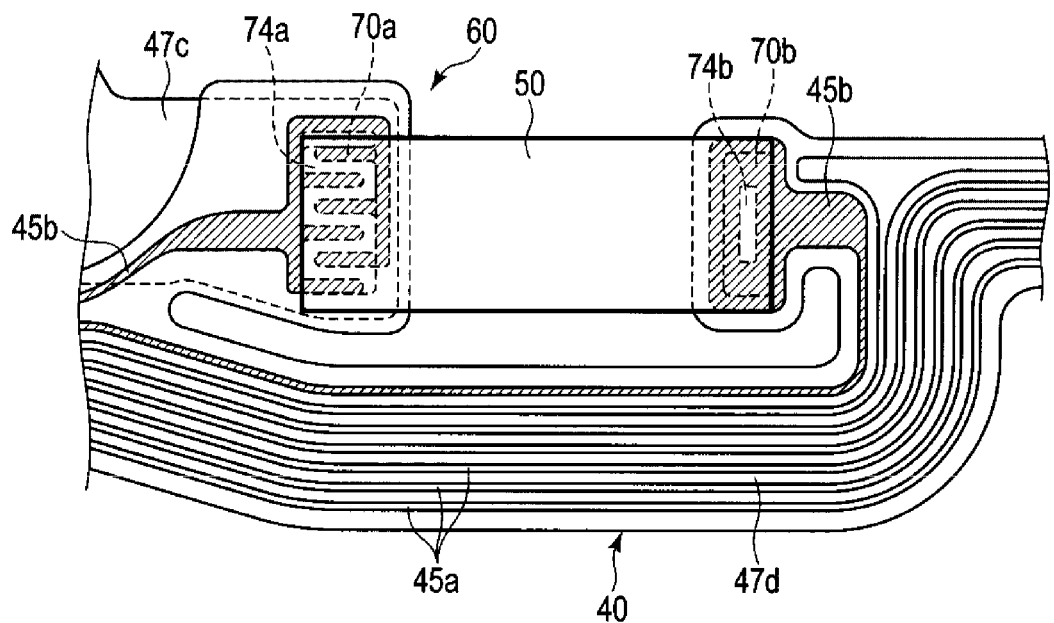
FIG. 10 is a plan view depicting pad portions and a piezoelectric element of an HDD according to a third modification.

FIG. 10 is a plan view depicting connection pad portions and a piezoelectric element of a suspension assembly according to a third modification. As depicted in FIG. 10, according to the third modification, the opening 74a of the first connection pad 70a is formed into a wavelike shape.

Fourth Modification

Figure 11:
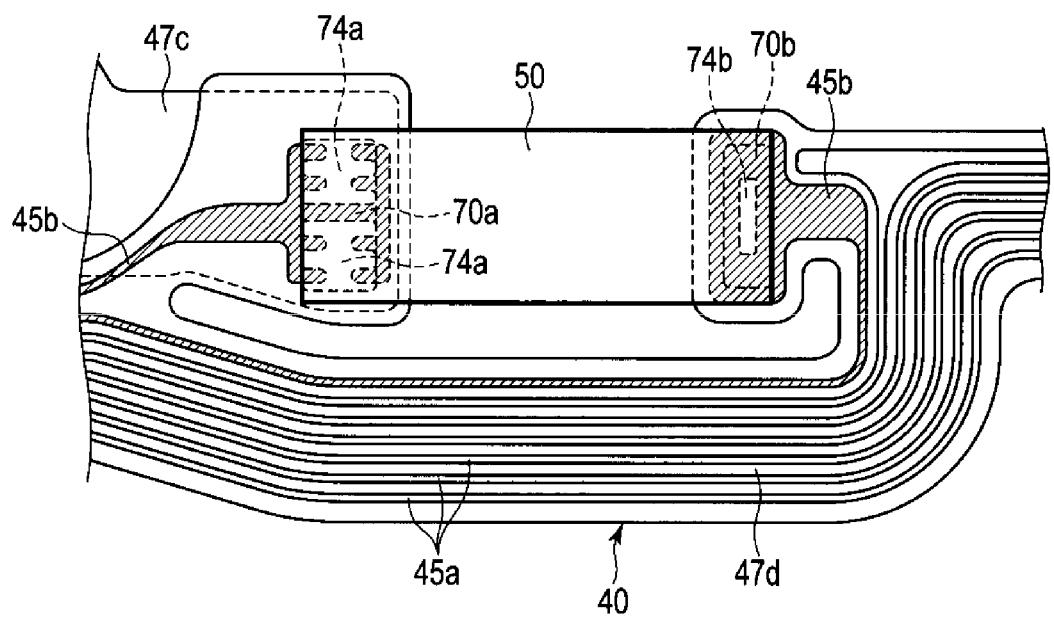
FIG. 11 is a plan view depicting pad portions and a piezoelectric element of an HDD according to a fourth modification.

FIG. 11 is a plan view depicting connection pad portions and a piezoelectric element of a suspension assembly according to a fourth modification. As depicted in FIG. 11, according to the fourth modification, two openings 74a are formed in the first connection pad 70a and each opening 74a has a generally H-shape.

Fifth Modification

Figure 12:
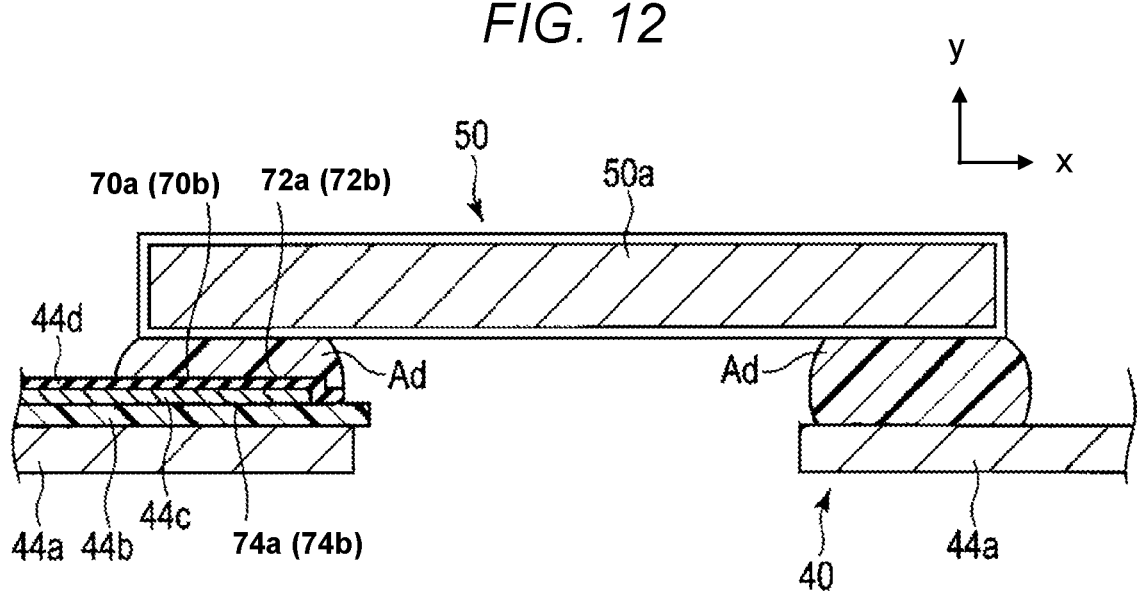
FIGS. 12 and 13 are each a cross-sectional view of pad portions and a piezoelectric element of an HDD according to a fifth modification.

FIG. 12 is a cross-sectional view of connection pads and a piezoelectric element of an HDD according to a fifth modification. This cross-sectional view corresponds to the cross-sectional view shown in FIG. 7, i.e., along line A-A of FIG. 6. However, in the fifth modification, unlike the embodiments and modifications stated above, both connection pads 70a and 70b are arranged on one side of the piezoelectric element 50, and the other end of piezoelectric element 50 is simply bonded to the flexure 40 by the adhesive Ad. In other words, the connection pads 70a and 70b, the openings 72a and 72b, and the openings 74a and 74b, which are invisible in FIG. 12, are located on the left side of the piezoelectric element 50 (i.e., the side of the connection end portion 40C in FIG. 2).

Figure 13:
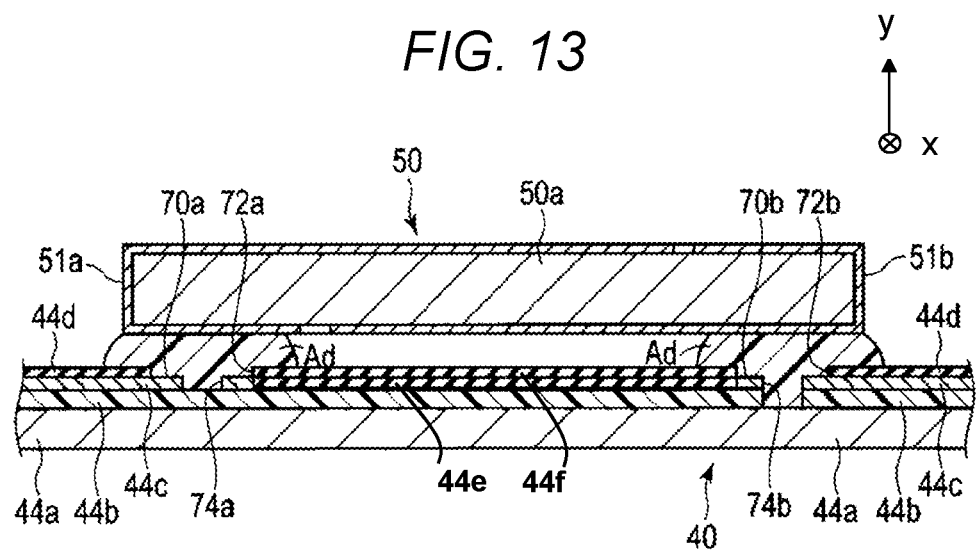

FIG. 13 shows the two connection pads 70a and 70b viewed from the side of the connection end portion 40C. As shown in FIG. 13, similar to the other embodiments, the connection pads 70a and 70b are connected by the electrodes 51a and 51b of the piezoelectric element 50. However, unlike the embodiment shown in FIG. 6, there are no gaps in the sheet metal 44a, the insulating layer 44b, and the cover insulating layer 44d between the two connection pads 70a and 70b. Further, insulating layers 44e and 44f are formed on the insulating layer 44b between the openings 74a and 74b formed by the conductive layer 44c, and there is a gap between the adhesives Ad of the two connection pads 70a and 70b. As such, no material is filled in the gap between the adhesives Ad. This configuration may be used when the piezoelectric element 50 is of a film type.

In any of the first to fifth modifications, it is possible to improve the adhesive strength between conductive adhesive Ad and each of the first and second connection pads 70a and 70b.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, while the pair of piezoelectric elements 50 are each configured to be attached to the gimbal portion 36 and located closer to the base end portion of the load beam 35 than the magnetic head 17 in the embodiment, the configuration of the pair of piezoelectric elements 50 is not limited to this configuration. The pair of piezoelectric elements 50 may be, for example, disposed on both sides in the width direction of the support portion (tongue portion 36a) supporting the magnetic head 17 and arranged side by side with the magnetic head 17. The number of piezoelectric elements 50 is not limited to two and, for example, a single piezoelectric element may be used. The shape of the first and second connection pads 70a and 70b is not limited to the rectangular shape and may be selected from various shapes including an elliptical shape, a circular shape, a polygonal shape.

What is claimed is:

1. A head suspension assembly comprising:
   a support plate;
   an interconnection member comprising:
      a metal plate on the support plate,
      a first insulating layer on the metal plate,
      a conductive layer on the first insulating layer and forming a pair of connection pads, and
      a second insulating layer on the conductive layer;
   a head mounted on the interconnection member; and
   a piezoelectric element electrically connected to the connection pads and configured to displace the head when a predetermined voltage is applied across the connection pads, wherein
   an opening penetrating at least the second insulating layer and the conductive layer is formed in each of the connection pads, the opening formed in one of the connection pads having a wavelike shape, and
   the piezoelectric element is electrically connected to each of the connection pads by a conductive adhesive, which contacts at least the piezoelectric element, the connection pad, and a side surface of the second insulating layer.

2. The head suspension assembly according to claim 1, wherein the opening formed in the other of the connection pads has a different shape from the opening formed in said one of the connection pads.

3. The head suspension assembly according to claim 2, wherein the opening formed in the other of the connection pads has a rectangular shape.

4. The head suspension assembly according to claim 1, wherein the conductive adhesive is filled in the opening formed in each of the connection pads.

5. The head suspension assembly according to claim 1, wherein the opening formed in the other of the connection pads further penetrates the first insulating layer.

6. The head suspension assembly according to claim 5, wherein the conductive adhesive connecting the other of the connection pads to the piezoelectric element further contacts a side surface of the first insulating layer and the metal plate.

7. The head suspension assembly according to claim 1, wherein said one of the connection pads in which the opening having the wavelike shape is formed is closer to the head than the other of the connection pads.

8. A disk apparatus comprising:
   a disk-like recording medium having a recording layer; and
   a head suspension assembly comprising:
      a support plate,
      an interconnection member comprising:
         a metal plate on the support plate,
         a first insulating layer on the metal plate,
         a conductive layer on the first insulating layer and forming a pair of connection pads, and
         a second insulating layer on the conductive layer,
      a head mounted on the interconnection member and configured to read data from and write data onto the recording layer, and
      a piezoelectric element electrically connected to the connection pads and configured to displace the head when a predetermined voltage is applied across the connection pads, wherein
      an opening penetrating at least the second insulating layer and the conductive layer is formed in each of the connection pads, the opening formed in one of the connection pads having a wavelike shape, and
      the piezoelectric element is electrically connected to each of the connection pads by a conductive adhesive, which contacts at least the piezoelectric element, the connection pad, and a side surface of the second insulating layer.

9. The disk apparatus according to claim 8, wherein the opening formed in the other of the connection pads has a different shape from the opening formed in said one of the connection pads.

10. The disk apparatus according to claim 9, wherein the opening formed in the other of the connection pads has a rectangular shape.

11. The disk apparatus according to claim 8, wherein the conductive adhesive is filled in the opening formed in each of the connection pads.

12. The disk apparatus according to claim 8, wherein the opening formed in the other of the connection pads further penetrates the first insulating layer.

13. The disk apparatus according to claim 12, wherein the conductive adhesive connecting the other of the connection pads to the piezoelectric element further contacts a side surface of the first insulating layer and the metal plate.

14. The disk apparatus according to claim 8, wherein said one of the connection pads in which the opening having the wavelike shape is formed is closer to the head than the other of the connection pads.

\* \* \* \* \*